United States Patent
Yamada et al.

(10) Patent No.: US 6,450,522 B1
(45) Date of Patent: Sep. 17, 2002

(54) TRANSPORTING VEHICLE

(75) Inventors: Susumu Yamada, 167, Oazaminoura, Ohmi-cho, Sakata-gun, Shiga-ken (JP); Heinz-Bernd Langendorf, Waltrop (DE)

(73) Assignee: Susumu Yamada, Shiga-ken (JP)

( * ) Notice: Subject to any disclaimer, the term of this patent is extended or adjusted under 35 U.S.C. 154(b) by 0 days.

(21) Appl. No.: 09/675,625

(22) Filed: Sep. 29, 2000

(30) Foreign Application Priority Data

Oct. 1, 1999  (JP) ........................................... 11-281703

(51) Int. Cl.⁷ ........................... B62D 21/14; B62D 61/12
(52) U.S. Cl. ................. 280/414.5; 280/418.1; 280/43; 296/26.08; 414/495
(58) Field of Search ................... 280/408, 410, 280/411.1, 412, 414.5, 418, 418.1, 400, 403, 475, 43, 43.11, 43.12, 43.23, 43.24, 656; 414/495, 474, 786; 180/14.1; 296/26.08

(56) References Cited

U.S. PATENT DOCUMENTS

| | | | |
|---|---|---|---|
| 3,217,911 A | * 11/1965 | McMullen | |
| 3,288,491 A | 11/1966 | Stricker, Jr. et al. | |
| 3,294,419 A | * 12/1966 | Martin et al. | |
| 3,567,252 A | 3/1971 | Zubko | |
| 5,236,294 A | * 8/1993 | Willis | |
| 5,678,977 A | * 10/1997 | Nordlund | |

FOREIGN PATENT DOCUMENTS

| | | |
|---|---|---|
| DE | 1272746 | 7/1968 |
| EP | 1107763 | 3/1968 |
| EP | 0649772 | 4/1995 |
| EP | 0763445 | 3/1997 |
| GB | 2183559 | 6/1987 |
| JP | 58049530 | 3/1983 |

* cited by examiner

Primary Examiner—Anne Marie Boehler
(74) Attorney, Agent, or Firm—Jordan and Hamburg LLP (57) ABSTRACT

In a transporting vehicle provided with a trailer hauled by a tractor, the trailer is constructed by a first trailer unit connectable with the tractor and a second trailer unit detachably connectable with the first trailer unit. At mutually opposed connecting sections of the first and second trailer units is provided a connecting mechanism for integrally connecting the first and second trailer units with the rear end of the first trailer unit held in contact with the front end of the second trailer unit. The transporting vehicle can transport cargoes on roads other than main roads while being allowed to have a relatively simple construction and an improved loading capacity.

8 Claims, 9 Drawing Sheets

TRANSPORTING VEHICLE

This application is based on patent application No. 11-281703 filed in Japan, the contents of which are hereby incorporated by references.

BACKGROUND OF THE INVENTION

This invention relates to a transporting vehicle provided with a trailer particularly suitable for transporting heavy materials such as concrete units used for constructing a building.

Among a variety of conventional transporting vehicles for transporting goods and commodities is known a traction-type transporting vehicle suitable for transporting bulky heavy materials. This transporting vehicle is comprised of a tractor carrying an engine and a trailer connected with this tractor. Since the trailer is connected with the tractor rotatably about a vertical shaft, the tractor and the trailer are relatively rotated about the vertical shaft with respect to each other when the transporting vehicle approaches a curve while being running, thereby enabling a deviation of traces of inner wheels to be reduced. Accordingly, the transporting vehicle can run on normal public roads even if it is slightly longer, and proves convenient and useful in transporting bulky cargoes.

It has been considered to improve a loading capacity by elongating the trailer of the above transporting vehicle. The length of the conventional transporting vehicle is set at a maximum length which enables the transporting vehicle to run on normal public roads without any problems. Thus, even if the loading capacity may be improved by elongating the transporting vehicle, it becomes difficult for the transporting vehicle to run on narrow roads other than wide main roads or highways.

SUMMARY OF THE INVENTION

It is an object of the present invention to provide a transporting vehicle which is free of the above problems residing in the prior art.

According to an aspect of the invention, a transporting vehicle comprises a tractor and a trailer to be hauled by the tractor. The trailer is constructed by a first trailer unit connectable with the tractor and a second trailer unit detachably connectable with the first trailer unit, and a connecting mechanism provided at mutually opposed connecting sections of the first and second trailer units for integrally connecting the first and second trailer units while a rear end of the first trailer unit and a front end of the second trailer unit are held in contact with each other.

These and other objects, features and advantages of the present invention will become more apparent upon a reading of the following detailed description and accompanying drawings.

DETAILED DESCRIPTION OF THE PREFERRED EMBODIMENTS OF THE INVENTION

As shown in FIGS. 1A to 2B, a transporting vehicle 1 is comprised of a motor-driven tractor 2 and a trailer 3 detachably connectable with the tractor 2. The tractor 2 has a chassis 21 provided with four wheels, and a passenger compartment is provided at a front side (at the left side in FIGS. 1A and 1B) of the chassis 21, and a connecting table 23 used to connect the tractor 2 with the trailer 3 is provided behind the chassis 21.

The connecting table 23 is comprised of a lower connecting table 23a having a conical shape, and an upper connecting table 23b rotatably supported on the top of the lower connecting table 23a about a vertical shaft 23c. The upper connecting table 23b extends obliquely upward toward the back from the vertical shaft 23c. The trailer 3 is connected with the upper connecting table 23b so that the tractor 2 and the trailer 3 are relatively rotatable about the vertical shaft 23c on the road surface.

The trailer 3 is comprised of a first trailer unit 31 connectable with the tractor 2 and a second trailer unit 32 detachably connectable with the first trailer unit 31. The first trailer unit 31 is provided with a pair of driven wheels 33 which are spaced apart along the widthwise direction (a direction normal to the plane of FIGS. 1A and 1B) in a position slightly behind a middle position with respect to the forward and backward directions of the first trailer unit 31, and the second trailer unit 32 is provided with two pairs of driven wheels 33 arranged in serial substantially in a middle position with respect to forward and backward directions of the second trailer unit 32. The first and second trailer units 31, 32 are provided with vehicle height changers 4 to be described later for moving a vehicle body upward and downward by projecting and retracting the respective driven wheels 33 with respect to the vehicle body, and a connecting mechanism 5 to be described in detail later for integrally connecting the first and second trailer units 31, 32 is provided between a rear part of the first trailer unit 31 and a front part of the second trailer unit 32.

Particularly, a pair of connection rods 31a spaced apart along the widthwise direction of the first trailer unit 31 project forward from an upper part of the vehicle body of the first trailer unit 31. A front vehicle height changer 30 is provided between the connection rods 31a and the connecting table 23.

The front vehicle height changer 30 is comprised of an intermediate member, which has its rear end portion connected with the rear end of the upper connecting table 23b rotatably about a horizontal axis and has its front end portion connected with the front ends of the connecting rods 31a rotatably about a horizontal axis, and a hydraulic cylinder 30b mounted at the leading ends of the connection rods 31a.

Figure 1A:
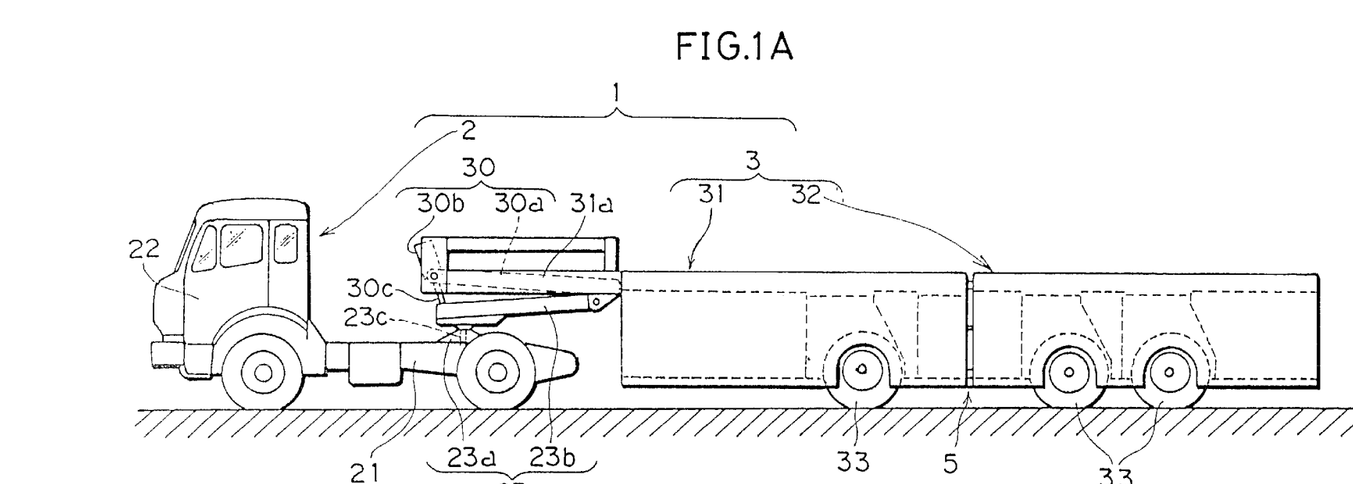
FIG. 1A is a side view diagrammatically showing a transporting vehicle according to an embodiment of the invention, a trailer being in a raised state.
Figure 1B:
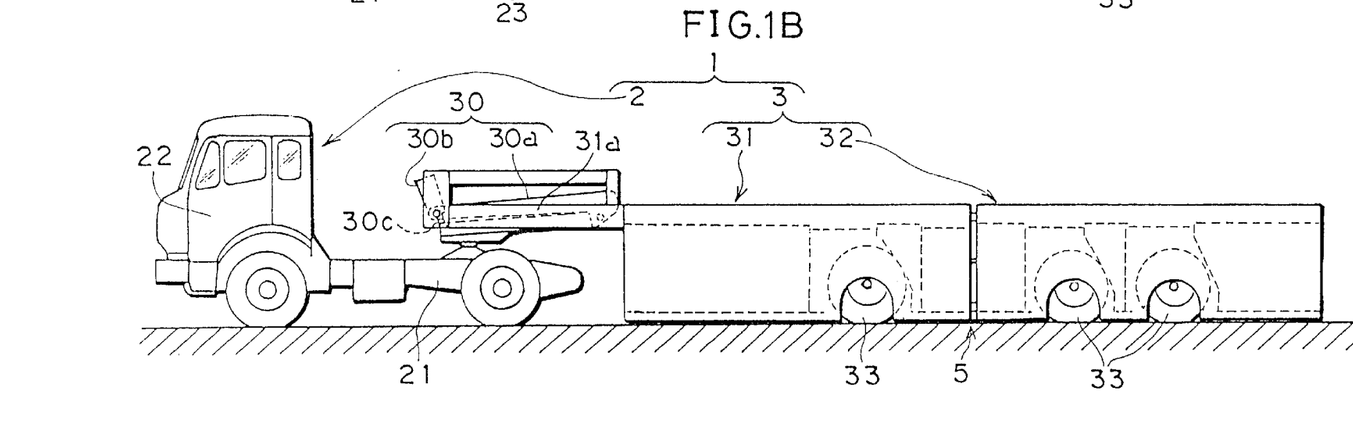
FIG. 1B is a side view showing the transporting vehicle whose trailer is in a lowered state.

A piston rod 30c of the hydraulic cylinder 30b is in contact with the upper surface of the leading end of the upper connecting table 23b. Accordingly, while the piston rod 30c is projected by the drive of the hydraulic cylinder 30b in link with the vehicle height changer 4, the connection rods 31a are raised by a projected amount of the piston rod 30c as shown in FIG. 1A in response to its reaction force to locate the trailer 3 in the raised position. On the other hand, by retracting the piston rod 30c by driving the hydraulic cylinder 30b in a reverse direction, the connection rods 31a are lowered as shown in FIGS. 1 and 2B, thereby locating the trailer 3 in the lowered position.

Figure 3:
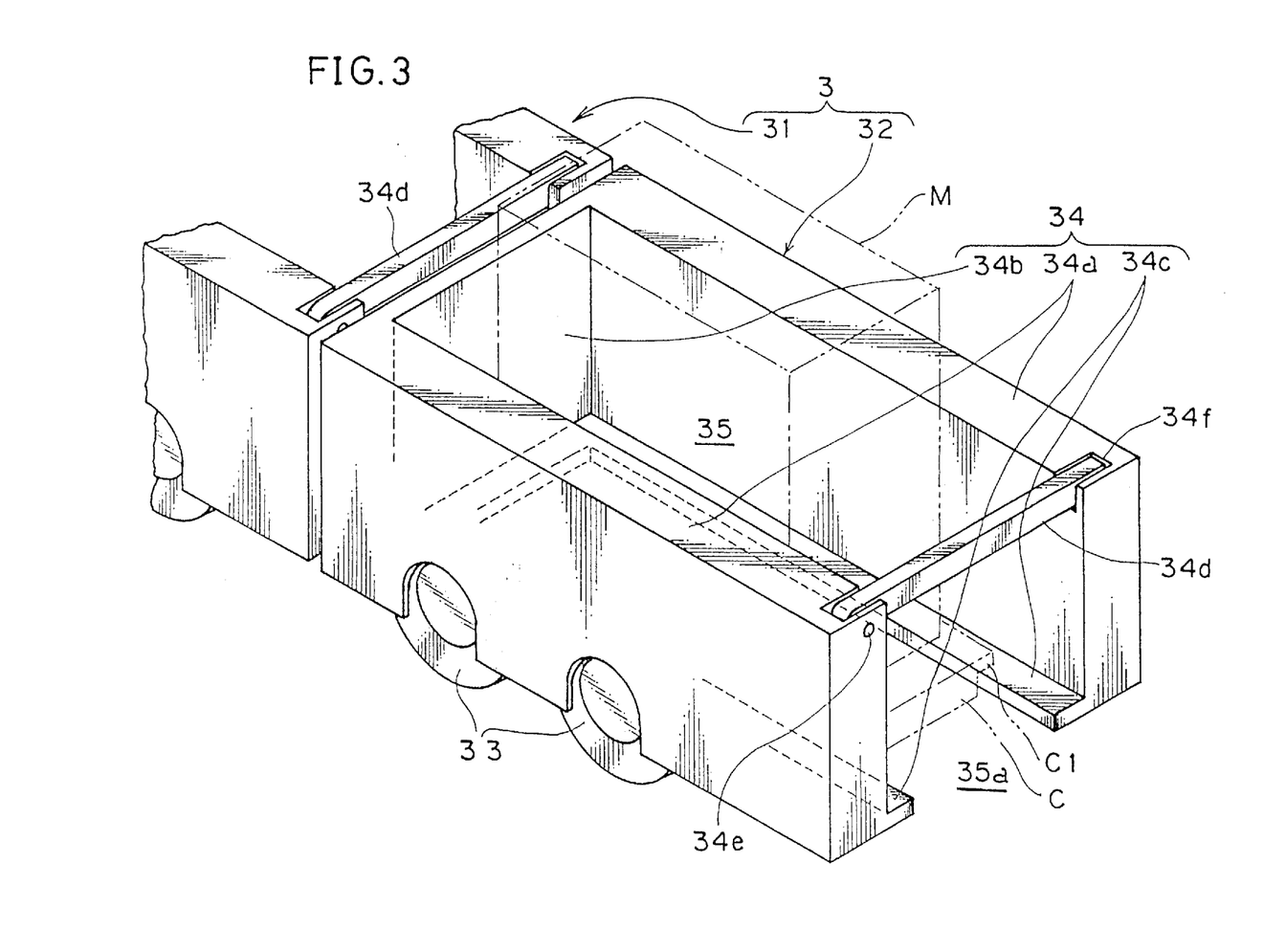
FIG. 3 is a perspective view showing a construction of the trailer.

As shown in FIG. 3, the trailer 3 is constructed by providing a vehicle body 34 having a substantially rectangular parallelepipedic shape with the driven wheels 33. The vehicle body 34 is U-shaped when viewed from above and is comprised of a pair of side walls 34a spaced apart along the widthwise direction of the vehicle body 34, a front wall 34b extending between the front ends of the side walls 34a, and a pair of supporting edges 34c spaced apart along the widthwise direction of the vehicle body 34, projecting from the bottom ends of the side walls 34a toward each other and extending along the forward and backward directions. The vehicle height changers 4 are mounted in the side walls 34a, and the driven wheels 33 are also mounted in the side walls 34a in such a manner that their projecting amounts are changeable while their lower portions are projecting outside.

A containing space for containing a cargo M is defined in a space enclosed by the side walls 34a and the front wall 34b of the trailer 3, and a clearance 35 for passing a container C therethrough is defined between the pair of supporting edges 34c. The container C has a width slightly smaller than the spacing between the supporting edges 34c of the side walls 34a, and has a pair of engaging edges C1 which project outward from the opposite upper ends of the container C with respect to its widthwise direction and extend along forward and backward directions.

Accordingly, by inserting the container C carrying the cargo M into the clearance 35A between the supporting edges 34c, the pair of engaging edges C1 are supported on the pair of supporting edges 34c and the container C is mounted on the vehicle body 34. As a result, the cargo M is loaded into the containing space 35 of the vehicle body 34.

The cargo M is loaded into and unloaded from the trailer 3 by moving the tractor 2 backward and forward with the trailer 3 located in the lowered position. Specifically, when the cargo M is loaded into the trailer 3, the container C carrying the cargo M is first placed on the ground. Subsequently, the trailer 3 is moved backward by driving the tractor 2, thereby fitting a portion of the container C below the engaging edges C1 into the clearance 35a between the supporting edges 34c of the trailer 3 as shown in FIG. 2B. Then, the trailer 3 is raised by driving the vehicle height changer 4, with the result that the cargo M placed on the container C is placed in the containing space 35 of the trailer 3 as shown in FIG. 2A.

Figure 2A:
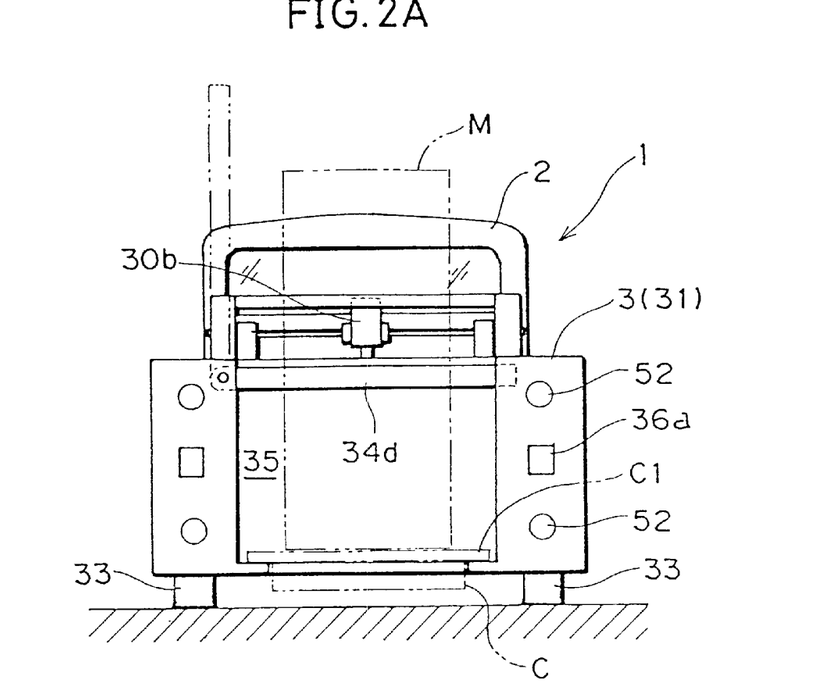
FIGS. 2A and 2B are rear views of a first trailer unit of the transporting vehicle.
Figure 2B:
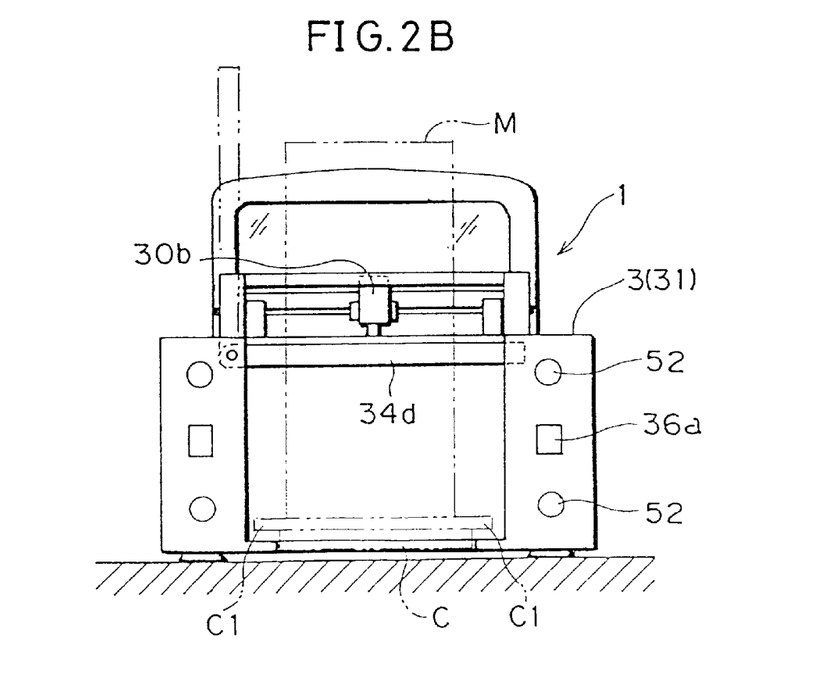

Conversely, when the cargo M placed on the trainer 3 as shown in FIG. 2A is to be unloaded, the trailer 3 is lowered by driving the vehicle height changer 4 to bring the bottom surface of the container C into contact with the ground as shown in FIG. 2B, and then the trailer 3 is moved forward by driving the tractor 2. By doing so, only the container C remains on the ground, i.e. the cargo M on the container C is unloaded from the trailer 3.

Further, a door frame 34d as shown in FIG. 3 extends between the upper ends of the side walls 34a at the rear end of the trailer 3. This door frame 34d is supported on one side wall 34a rotatably about a horizontal shaft 34e. A supporting recess 34f for receiving and supporting the leading end of the door frame 34d is formed in the other side wall 34a. With the cargo M placed in the containing space 35, the door frame 34d is rotated clockwise about the horizontal shaft 34e to fit the leading end thereof into the supporting recess 34f. This prevents the cargo M from dropping off through the open rear end of the trailer 3.

Figure 4A:
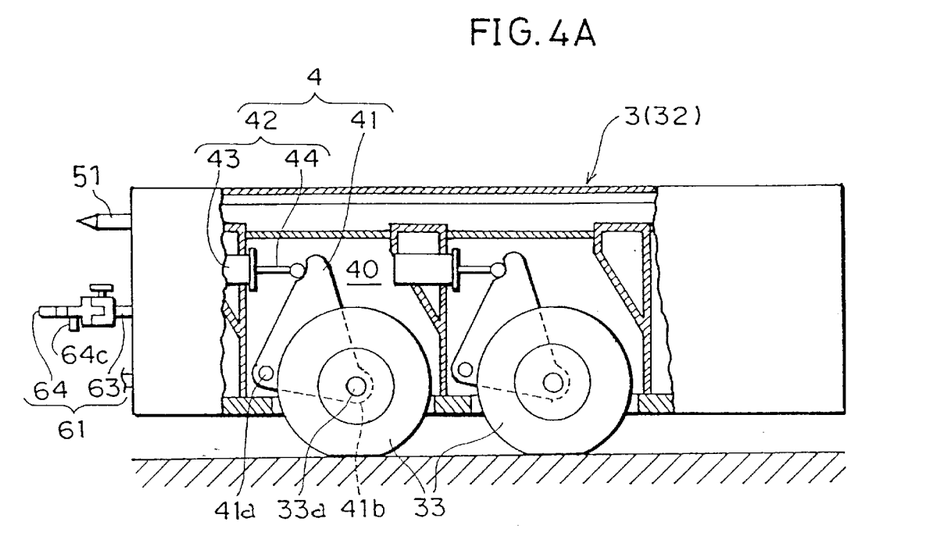
FIGS. 4A and 4B are diagrams showing a construction of vehicle height changers, when the trailer is set at a raised position by the vehicle height changers and when the trailer is set at a lowered position by the vehicle height changers, respectively.
Figure 4B:
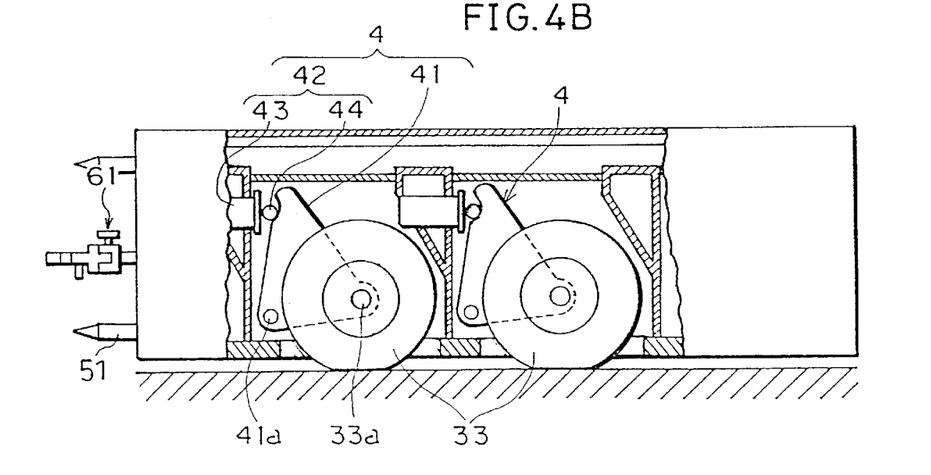

FIGS. 4A and 4B are diagrams showing a construction of the vehicle height changer 4. FIG. 4A shows a state where the trailer 3 is located in the raised position by the vehicle height changers 4 and FIG. 4B shows a state where the trailer 3 is located in the lowered position. It should be noted that only the second trailer unit 32 of the trailer 3 is shown in FIGS. 4A and 4B. As shown in FIGS. 4A and 4B, each vehicle height changer 4 is comprised of a substantially isosceles-triangular shaped cam 41 arranged in the side wall 34a of the vehicle body 34 and a cylinder unit 42 for actuating the cam 41.

The cam 41 is positioned such that the base of the triangular shape extends substantially along forward and backward directions (transverse direction in the planes of FIGS. 4A and 4B) in a wheel accommodating space 40 enclosed by a specified frame inside the side wall 34a. Such a cam 41 has its front (left in the planes of FIGS. 4A and 4B) lower portion rotatably supported about a cam support shaft 41a extending in the widthwise direction (direction normal to the planes of FIGS. 4A and 4B), and is provided in its rear corner portion with a bearing 41b for bearing an axle 33a of the driven wheels 33. Thus, the driven wheels 33 project from and retract into the wheel accommodating spaces 40 by rotating the cams 41 about the cam support shafts 41a in forward and reverse directions.

The cylinder unit 42 is comprised of a hydraulic cylinder 43 which is operated by a hydraulic pressure of a hydraulic oil from an unillustrated hydraulic unit mounted in a specified position of the tractor 2 (see FIGS. 1A and 1B) and a piston rod 44 which is projectable and rectractable with respect to the hydraulic cylinder 43. The leading end of the piston rod 44 is in contact with the upper front edge of the cam 41, which in turn rotates in the forward and reverse directions by the projection and retraction of the piston rod 44. Accordingly, the driven wheels 33 are changeable between a projecting state where they projects from the wheel accommodating spaces 40 by about ⅓ of their vertical dimension (state of FIG. 4A) and a retracted state where most of the drive wheels 33 except their bottom portion are located inside the wheel accommodating spaces (state of FIG. 4B).

Thus, with the piston rod 44 projected from the hydraulic cylinder 43 by driving the cylinder unit 42, the driven wheels 33 project out from the wheel accommodating spaces 40 by the clockwise rotation of the cams 41 about the cam supporting shafts 41a, thereby bringing the trailer 3 into the raised position as shown in FIG. 4A. On the other hand, the cams 41 rotate counterclockwise about the cam supporting shafts 41a by pulling the piston rods 44 back into the hydraulic cylinders 43, thereby retracting the driven wheels 33 into the wheel accommodating spaces 40. As a result, the trailer 3 is brought into the lowered position as shown in FIG. 4B.

Figure 5:
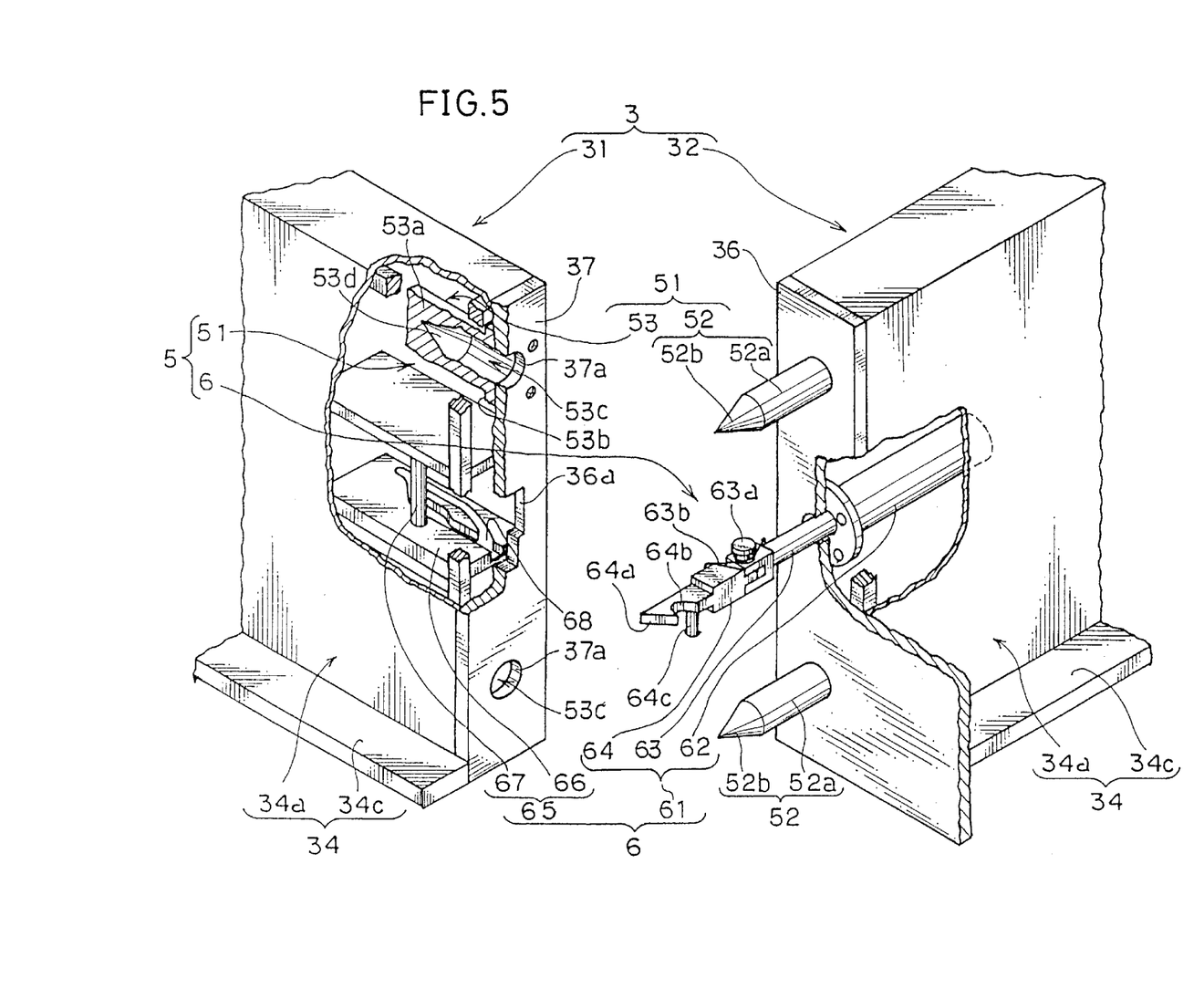
FIG. 5 is a perspective view partly cut away showing a construction of a connecting mechanism for detachably and integrally connecting the first and second trailer units.

As shown in FIG. 5, the connecting mechanism 5 is provided with a fitting mechanism 51 at the rear end of the first trailer unit 31 and the front end of the second trailer unit 32, and a pulling mechanism 6 for pulling the first trailer unit 31 held in contact with the second trailer unit 32 to make them into a single unit.

The fitting mechanism 51 includes a pair of vertically spaced-apart connection rods (connecting projections) 52 which project forward from a front plate 36 of the side wall 34a of the second trailer unit 32, and engaging members 53 which are so provided inside a back plate 37 of the side wall 34a of the first trailer unit 31 as to conform to the respective connection rods 52. The connection rods 52 are fitted into the engaging members 53.

Each connection rod 52 is comprised of a cylindrical rod main body 52a at its base end and a conical member 52b provided at the leading end of the rod main body 52a. On the other hand, each engaging member 53 is comprised of a hollow cylindrical member main body 53a and a flange 53b formed at the front end of the member main body 53a.

The member main bodies 53a are each formed with a connection hole 53c having an opening in the rear end surface, and the rod main bodies 52 are slidably fitted into the corresponding connection holes 53c. A conical hole 53c corresponding to the conical member 52b is formed at the back of each connection hole 53c. The back plate 37 of the first trailer unit 31 is formed, in positions corresponding to the connection rods 52, with insertion holes 37a for permitting the insertion of the connection rods 52. The flanges 53b are secured by bolts while being held in contact with the rear surface of the back plate 37 such that the connection holes 53c are concentric with the insertion holes 37a, with the result that the engaging members 53 are mounted inside the side wall 34a of the first trailer unit 31.

Accordingly, by moving the first trailer unit 31 backward by driving the tractor 2 (see FIG. 1) with the second trailer unit 32 stopped, the upper and lower connection rods 52 are fitted into the upper and lower engaging members 53 while being held in sliding contact therewith. As a result, the conical members 52b are fitted into the conical holes 53d.

Figure 6A:
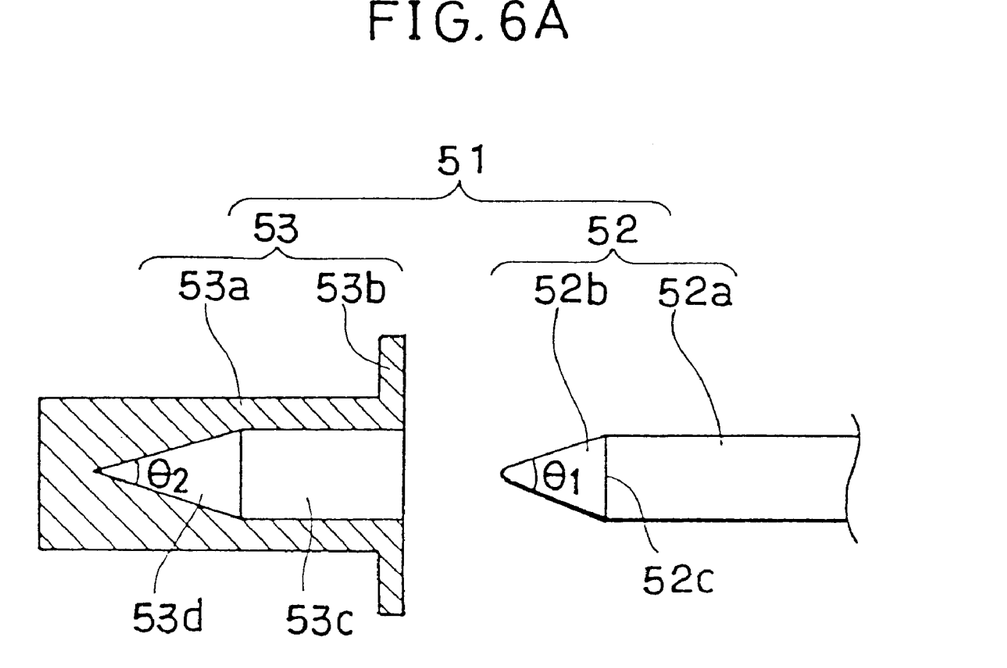
FIGS. 6A and 6B are diagrams of a construction of a fitting mechanism showing a state immediately before a connection rod is fitted into a receiving member and a state where the connection rod is fitted into the receiving member.
Figure 6B:
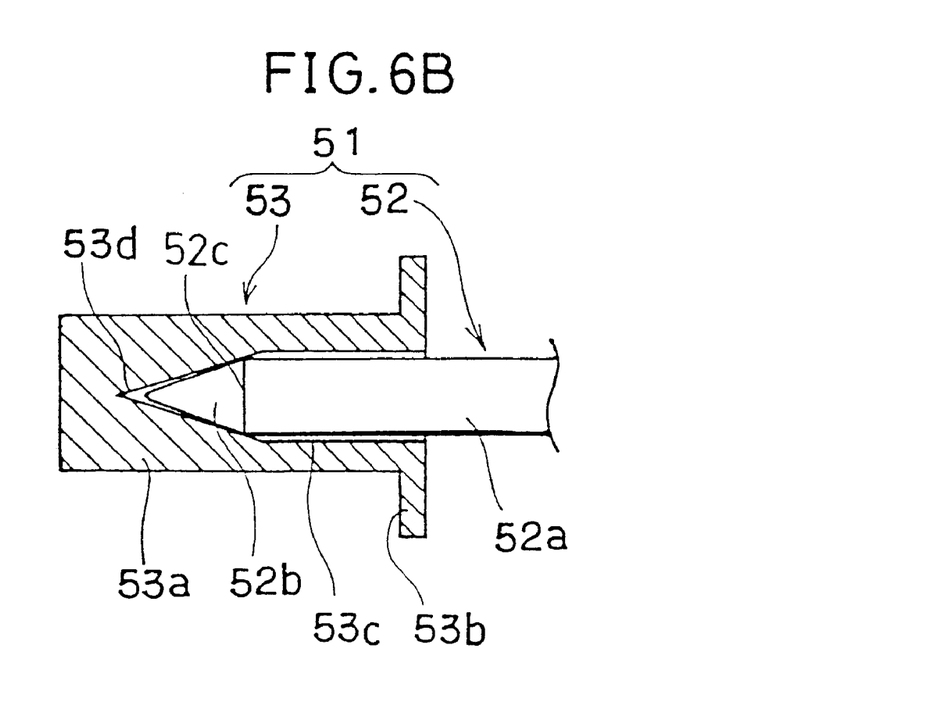

In this embodiment, as shown in FIG. 6A, a center angle θ1 of the conical member 52b of the connection rod 52 is set slightly larger than a center angle θ2 of the conical hole 53d of the engaging member 53. Accordingly, with the connection rod 52 fitted into the engaging member 53, a boundary line 52c between the rod main body 52a and the conical member 52b of the connection rod 52 is in line-contact with the inner surface of the conical hole 53d near its entrance over the entire circumference. Therefore, the connection rod 52 can be securely held inserted without shaking with respect to the engaging member 53.

The pulling mechanism 6 is, as shown in FIG. 5, comprised of a cylinder mechanism 61 provided in the second trailer unit 32 and an engaging mechanism 65 provided in the first trailer unit 31 in conformity with the cylinder mechanism 61.

The cylinder mechanism 61 includes a hydraulic cylinder 62 secured to the rear surface of the front plate 36 of the second trailer unit 32, a piston rod 63 projectable from and retractable into the hydraulic cylinder 62, and a locking member 64 provided at the leading end of the piston rod 63. The hydraulic cylinder 62 has a flange 62a at its leading end, and is fixed in the side wall 34a by securing this flange 62a to the rear surface of the front plate 36 concentrically with the insertion hole 37b formed substantially in a vertical center position of the front plate 36 by bolts.

The piston rod 63 is projected out through the insertion hole 37b with the hydraulic cylinder 62 secured to the front plate 36. The locking member 64 is supported on the leading end of the piston rod 63 rotatably about a coupling shaft 63a within a specified range. The rotatable range of the locking member 64 is defined between the same direction as the extension of the piston rod 63 and a direction displaced clockwise from this same direction about the coupling shaft 63a by a specified angle.

A coil spring 63b is mounted on the coupling shaft 63a, and gives the locking member 64 such a biasing force as to rotate counterclockwise about the coupling shaft 63a. Accordingly, the locking member 64 normally extends in the direction of the extension of the piston rod 63 as shown in FIG. 5.

Such a locking member 64 is tapered at its leading end from the right side toward the left side to form a slanted guide surface 64a, and a locking slot 64b is formed near the slanted guide surface 64a near the right side of the locking member 64. Further, a guidable rod 64c projects downward from the lower surface of the locking member 64 in a position near the locking slot 64b.

The engaging mechanism 65 includes a guide plate 66 which is so provided in the side wall 34a of the first trailer unit 31 as to conform to the cylinder mechanism 61, and an engaging rod (engaging member) 67 standing on the guide plate 66. The guide plate 66 is so mounted as to extend along horizontal direction in the side wall 34a while being held in contact with the rear surface of the back plate 37 of the first trailer unit 31. On the other hand, the back plate 37 is formed with a rectangular hole 36a facing the locking member 64 of the cylinder mechanism 61 above the guide plate 66. The locking member 64 is introduced through the rectangular hole 36a by bringing the back plate 37 of the first trailer unit 31 closer to the front plate 36 of the second trailer unit 32.

In the upper surface of the guide plate 66 is formed a guide groove 68 extending along forward and backward directions and adapted to guide the guidable rod 64c. As the first trailer unit 31 moves backward with the locking member 64 fitted into the rectangular hole 36a, the locking member 64 makes a specified rotational movement about the coupling shaft 63a while the guidable rod 64c is being guided by the guide groove 68. In this way, the locking slot 64b of the locking member 64 is engaged with the engaging rod 67, and this engaged state can be canceled according to the projection and retraction of the piston rod 63 caused by driving the hydraulic cylinder 62.

Figures 7A, 7B:
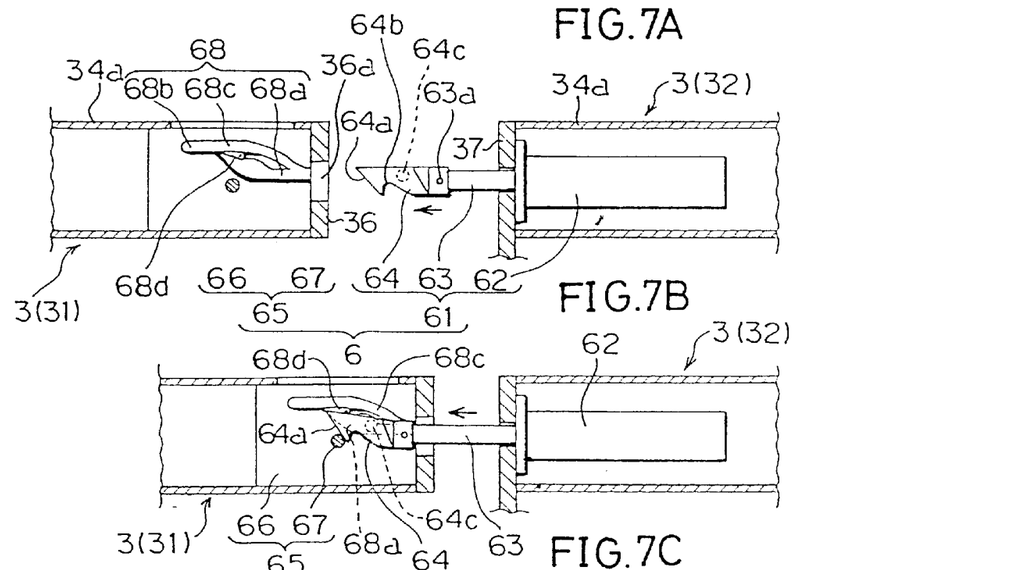
FIGS. 7A to 7E are plan views showing a construction of a guide groove formed in the upper surface of a guide plate.
Figures 7C, 7D, 7E:
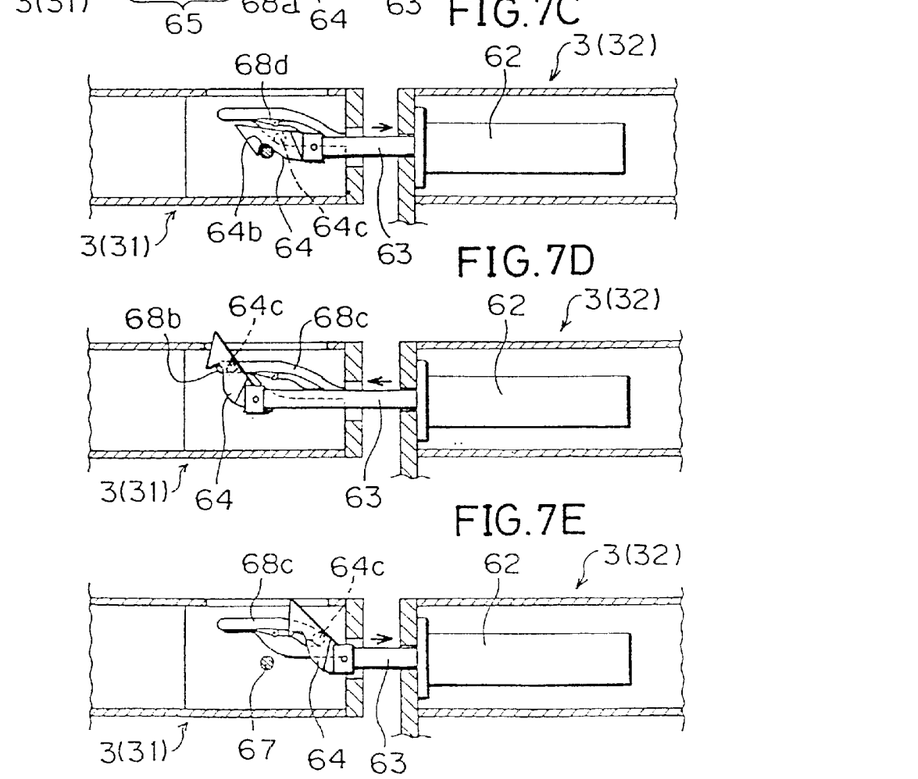

FIGS. 7A to 7E are plan views showing the guide groove 68 formed in the upper surface of the guide plate 66. FIG. 7A shows a state immediately before the guidable rod 64c is fitted into the guide groove 68, FIG. 7B shows a state immediately after the guidable rod 64c is fitted into the guide groove 68, FIG. 7C shows a state where the locking member 64 is engaged with the guidable rod 67, FIG. 7D shows a state where the guidable rod 64c is located at the very back of the guide groove 68, and FIG. 7E shows a state where the guidable rod 64 is located in a return guide groove 68c.

As shown in FIG. 7A, the guide groove 68 has a substantially rhombus shape when viewed from above, and is comprised of a starting guide groove 68a which extends straight forward (to the left of FIGS. 7A to 7E) from the rectangular hole 36a and is curved upward in the plane of FIGS. 7A to 7E, a common guide groove 68b extending straight forward from the front end of the starting guide groove 68*a*, and the return guide groove 68*c* which extends straight backward from the rear end of the common guide groove 68*b*, is curved downward in the plane of FIGS. 7A to 7E, and has its rear end joined with the starting guide groove 68*a*.

A guide claw 68*d* is provided at the front end of the starting guide groove 68*a*. This guide claw 68*d* is normally biased counterclockwise about a vertical shaft by a biasing force of an unillustrated biasing device, thereby holding its frontmost part in contact with one edge at the entrance of the common guide groove 68*b* to close the front end of the starting guide groove 68*a* while causing the common guide groove 68*b* and the return guide groove 68*c* to communicate with each other.

Accordingly, the guidable rod 64*c* fitted into the starting guide groove 68*a* relatively advances to push the guide claw 68*d* open at the front end of the starting guide groove 68*a*, thereby reaching the common guide groove 68*b*. When relatively moving back from the common guide groove 68*b*, the guidable rod 64*c* moves along the return guide groove 68*c* to the entrance of the starting guide groove 68*a* without passing through the starting guide groove 68*a* since the guide claw 68*d* closes the entrance to the starting guide groove 68*a*.

Hereinafter, the operation of the pulling mechanism 6 is described with reference to FIGS. 7A to 7E. First, as shown in FIG. 7A, the back plate 37 of the first trailer unit 31 is opposed to the front plate 36 of the second trailer unit 32 braked so as not to move. The first trailer unit 31 is slowly moved backward in this state. Then, the locking member 64 of the cylinder mechanism 61 enters the side wall 34*a* of the first trailer unit 31 through the rectangular hole 36*a* and the guidable rod 64*c* enters the starting guide groove 68*a*.

Subsequently, the piston rod 63 is projected by driving the hydraulic cylinder 62 after the backward movement of the first trailer unit 31 is temporarily stopped. Then, the locking member 64 moves forward while being guided by the starting guide groove 68*a* and the slanted guide surface 64*a* comes into contact with the guidable rod 67 as shown in FIG. 7B.

If the piston rod 63 continues to be projected in this state, the locking member 64 is guided in clockwise direction about the coupling shaft 63*a* since the slanted guide surface 64*a* is in contact with the guidable rod 67. When the rear end of the slanted guide surface 64*a* passes the guidable rod 67, the locking member 64 rotates counterclockwise about the coupling shaft 63*a* by the biasing force of the coil spring 63*b* (see FIG. 5). As a result, the locking slot 64*b* is fitted around the engaging rod 67 to engage the locking member 64 with the guidable rod 67.

If the piston rod 63 is pulled back by driving the hydraulic cylinder 62 in reverse direction in this state, the first trailer unit 31 moves backward toward the second trailer unit 32 as shown in FIG. 7B since the locking member 64 is engaged with the engaging rod 67. Accordingly, the conical members 52*b* of the connection rods 52 (see FIG. 6) are fitted into the conical holes 53*d* of the engaging members 53 to hinder the backward movement of the first trailer unit 31 and to securely and integrally connect the first and second trailer units 31, 32.

In order to separate the connected first and second trailer units 31, 32, the piston rod 63 is projected by driving the hydraulic cylinder 62 after the both trailers 31, 32 are braked so as not to brake. Then, the guidable rod 64*c* is guided into the starting guide groove 68*a*, advances therealong, and pushes the guide claw 68*d* open, thereby reaching the common guide groove 68*b* as shown in FIG. 7D. When the guidable rod 64*c* reaches the common guide groove 68*b*, the guide claw 68*d* returns to its original position to close the front end of the starting guide groove 68*a*.

If the piston rod 63 is pulled back by driving the hydraulic cylinder 62 in reverse direction in this state, the guidable rod 64*c* moves backward along the return guide groove 68*c* without interfering the engaging rod 67 as shown in FIG. 7E. By successively moving the first trailer unit 31 forward, the first trailer unit 31 is separated from the second trailer unit 32 as shown in FIG. 7A.

Figure 8A:
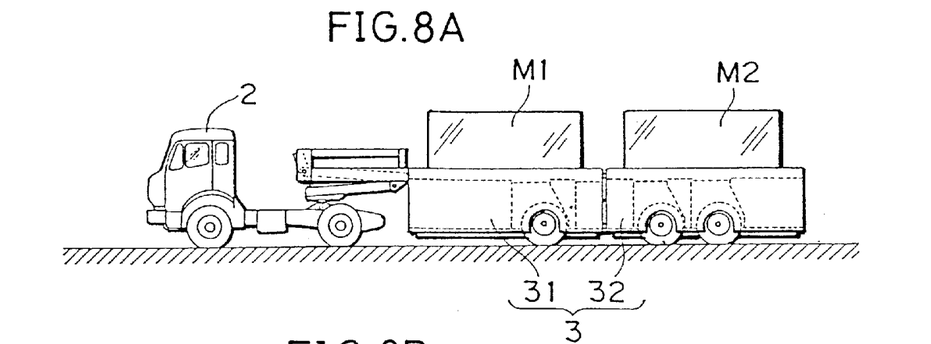
FIGS. 8A to 8D are diagrams showing used states of the transporting vehicle.
Figure 8B:
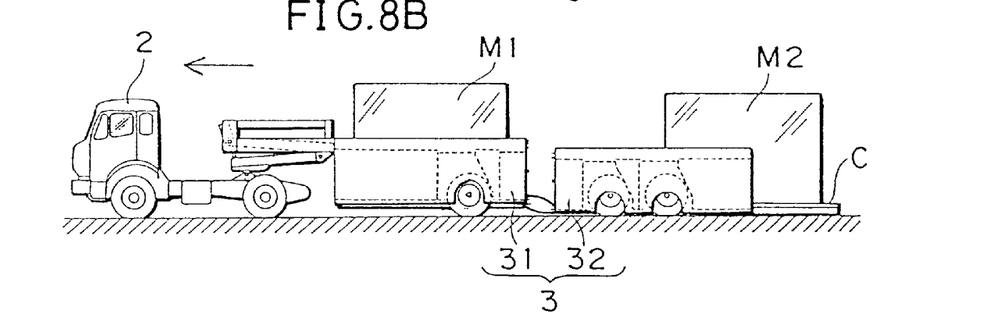
Figure 8C:
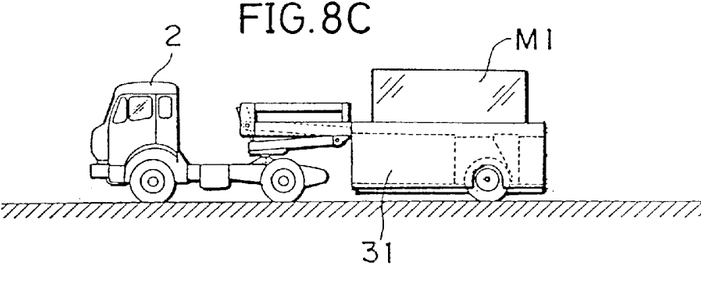
Figure 8D:
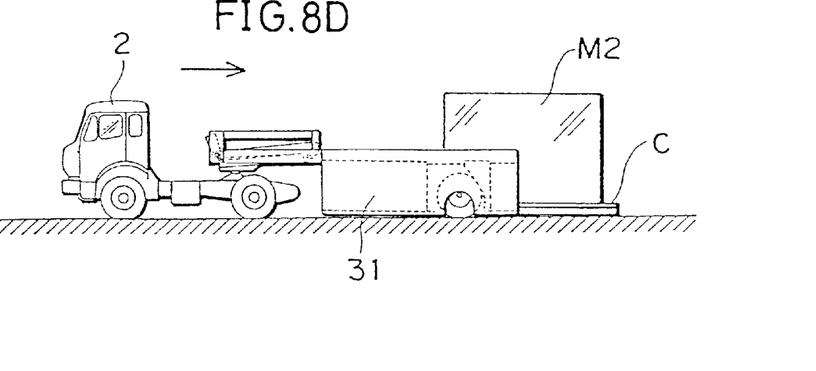

FIGS. 8A to 8D are diagrams showing the used states of the transporting vehicle 1. FIG. 8A shows a state where concrete building materials M1 for building a basement or cellar as cargoes M are loaded in the first and second trailer units 31, 32, FIG. 8B shows a state where the concrete building material M2 loaded on the second trailer unit 32 is being unloaded, FIG. 8C shows a state where the concrete building material M1 loaded on the first trailer unit 31 is being transported after the second trailer unit 32 is separated therefrom, and FIG. 8D shows a state where the concrete building material M2 unloaded from the second trailer unit 32 is being loaded onto the emptied first trailer unit 31.

First, the tractor 2 connected only with the first trailer unit 31 positioned in the lowered position is moved backward so that the rear part of the first trailer unit 31 approaches the concrete building material M1, which was produced in a certain factory and placed on the container C placed on the ground. By doing so, the engaging edges C1 of the container C are supported by the supporting edges 34*c* of the first trailer unit 31 (see FIG. 2). By moving the trailer 31 up to the raised position in this state, the concrete building material M1 is loaded onto the first trailer unit 31 via the container C.

Subsequently, the second trailer unit 32 is connected with the rear part of the first trailer unit 31 via hydraulic tubes and electric cables so as to enable the operation of the respective devices of the second trailer unit 32 and, then the concrete building material M2 is loaded onto the second trailer unit 32 by performing substantially the same loading operation as with the first trailer unit 31. Successively, the second trailer unit 32 is integrally connected with the first trailer unit 31 via the connecting mechanism 5 (see FIG. 5), with the result that two concrete building materials M1 and M2 are loaded in the transporting vehicle 1 as shown in FIG. 8A. These two concrete building materials M1 and M2 are shipped from the factory in this state, and the transporting vehicle 1 leaves for a building site. There is no problem in using the long trailer 3 by letting the transporting vehicle 1 to run only on selected main roads from the factory to a place near the building site.

In the case that the transporting vehicle 1 has to enter a narrow local road from the main road near the building site to reach the building site, it is once driven to a temporary place secured in advance nearby the destination. Here, after the hydraulic system and the electric system are connected via the hydraulic tubes and the electric cables by securing the connection of these systems, the second trailer unit 32 is separated from the first trailer unit 31, and the second trailer unit 32 is lowered to bring the bottom surface of the container C to the ground. In this state, the tractor 2 is advanced as shown in FIG. 8B. By doing so, the concrete building material M2 on the second trailer unit 32 is unloaded onto the ground.

Subsequently, by canceling the connection of the second trailer unit 32 with the first trailer unit 31 via the hydraulic tubs and the electric cables, the tractor 2 is connected only with the first trailer unit 31 carrying only one concrete building material M1 as shown in FIG. 8C. In this state, since the length of the trailer 3 is about the half of the initial length, the transporting vehicle 1 can run even on a narrow local road to bring the concrete building material M1 to the building site.

The transporting vehicle 1 is returned to the temporary place after unloading the concrete building material M1 at the building site, and the concrete building material M2 previously unloaded from the second trailer unit 32 is loaded onto the first trailer unit 31 as shown in FIG. 8D and is transported to the building site.

As described above, if the transporting vehicle 1 is used in transporting the bulky heavy concrete building materials M1, two concrete building materials M1 can be transported along the main road(s) from the factory to the place near the building site. Accordingly, a transportation cost can be reduced substantially to the half as compared to the conventional cases where one concrete building material is shipped by one transporting vehicle 1.

In the case that the transporting vehicle 1 has to enter a narrow local road from the main road near the building site, the trailer 3 is separate into the first and second trailer units 31, 32 at the temporary place to transport the concrete building materials M1 and M2 one by one. Therefore, the transporting vehicle 1 has a very wide range of application.

The present invention is not limited to the foregoing embodiment, but also embraces the following modifications.

(1) Although the front wall 34b is provided at the front end of the second trailer unit 32 in the foregoing embodiment, it may be deleted and the left and right side walls 34a may, instead, be connected by a bridging member having the same height as the supporting edges 34c. Such an arrangement enables a long cargo, which has such a length as to extend over the first and second trailer units 31, 32, to be loaded onto the trailer 3.

(2) The connecting mechanism 5 comprised of the connection rods 52 and the engaging members 53 and the pulling mechanism 6 comprised of the cylinder mechanism 61 and the engaging mechanism 65 are used to integrally connect the first and second trailer units 31, 32 in the foregoing embodiment. However, the present invention is not limited to the use of such a mechanism. A connecting mechanism for connecting the first and second trailer units 31, 32 as shown in FIGS. 9A and 9B may be adopted.

Figure 9A:
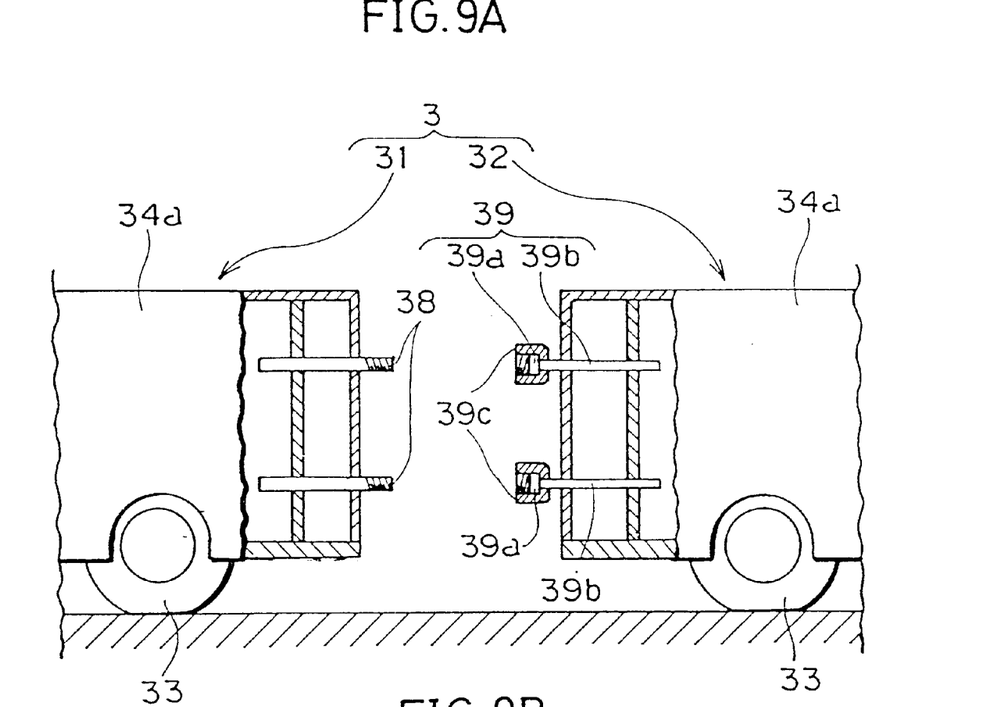
FIGS. 9A and 9B are diagrams showing a modification of the connecting mechanism, showing a state immediately before the first and second trailer units are connected and a state where the first and second trailer units are connected.

Specifically, as shown in FIG. 9A, a pair of upper and lower spiral rods 38 are provided in the rear portion of each side wall 34a of the first trailer unit 31 such that their threaded portions project backward, whereas two stepped rods 39 corresponding to the spiral rods 38 are provided in the front part of each side wall 34a of the second trailer unit 32 such that the leading ends thereof face the corresponding spiral rods 38. Each stepped rod 39 is comprised of a large diameter portion 39a located at the leading end and having the same diameter as the spiral rod 38 and a small diameter portion 39b having a diameter slightly smaller than that of the large diameter portion 39a. A cap nut 39 formed with an internal thread engageable with the threaded portion is fitted on the small diameter portion.

Figure 9B:
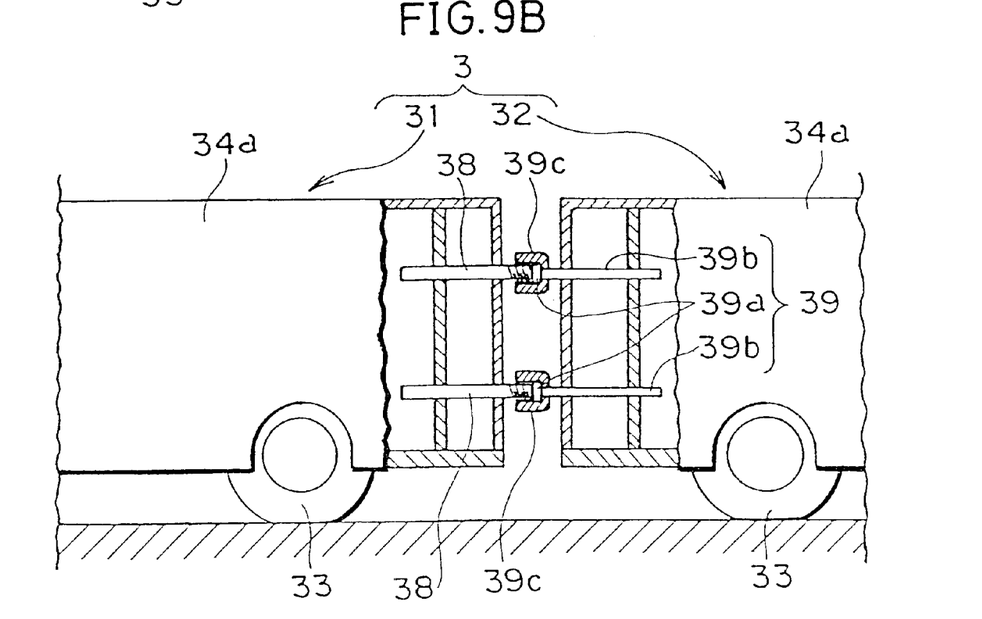

By this arrangement, the first and second trailer units 31, 32 are integrally connected with each other as shown in FIG. 9B by moving the rear end of the first trailer unit 31 closer to the front end of the second trailer unit 32 to bring the end surfaces of the spiral rods 38 and those of the large diameter portions 39a of the stepped rods 39 into contact with each other and fastening the cap nuts 39c to the spiral rods 38 in this state.

According to the connecting mechanism, it is sufficient to provide the bar-shaped spiral rods 38 at the rear end of the side walls 34a of the first trailer unit 31 and the bar-shaped stepped rods 39 at the front ends of the side walls 34a of the second trailer unit 32. Thus, the connecting mechanism can be simplified and the installation cost can be accordingly reduced.

As described above, an inventive transporting vehicle comprises a tractor and a trailer to be hauled by the tractor. The trailer is constructed by a first trailer unit connectable with the tractor and a second trailer unit detachably connectable with the first trailer unit; and a connecting mechanism provided at mutually opposed connecting sections of the first and second trailer units for integrally connecting the first and second trailer units while the rear end of the first trailer unit and the front end of the second trailer unit are held in contact with each other.

With this construction, the transporting vehicle is allowed to have an improved loading capacity by connecting the first and second trailer units. Since the first and second trailer units are integrally connected by the connecting mechanism, there is no likelihood that these trailers make an angle with respect to each other along the curvature of a road when the transporting vehicle makes a curve. Therefore, a long material which may extend over the first and second trailer units can be loaded.

Further, in the case that a plurality of cargoes are separately loaded on the first and second trailer units, the transporting vehicle runs on main road(s) with the first and second trailer units connected, and the second trailer unit is separated from the first trailer unit immediately before the transporting vehicle starts running a narrow road near an unloading end. First, the transporting vehicle connected only with the first trailer unit is driven to the unloading end and is returned after the cargo on the first trailer unit is unloaded. Subsequently, the cargo on the second trailer unit is transferred to the first trailer unit and the transporting vehicle is driven in this state to the unloading end to unload this cargo. In this way, an inconvenience that the transporting vehicle elongated by connecting the first and second trailer units cannot run on narrow roads can be avoided.

By constructing the trailer from the integrally connectable first and second trailer units, a heavy cargo can be securely transported to the destination by connecting and separating the first and second trailer units depending on the road condition while increasing the amount of cargo. Therefore, a transportation cost can be reduced as compared to a case where two transporting vehicles are used.

Accordingly, in the case that the first and second trailer units are rotatably connected about a specified vertical shaft, respectively, the running state of the second trailer unit is not stable (particularly prominent in the case of backward running), and the front trailer and the rear trailer cannot be located on the same straight line when the transporting vehicle makes a curve. This causes a problem that a long cargo extending over the two trailer units cannot be loaded. However, the inventive transporting vehicle is free from such problem. Further, since the first and second trailer units are integrally connected, legal restrictions for trailers can be cleared.

Preferably, the connecting mechanism comprises a connecting hole formed in a connection surface of either one of the first and second trailer units; a connecting projection provided on the other connection surface in conformity with the connecting hole; a cylinder mechanism provided at the connecting section of either one of the first and second trailer units and having a projectable and retractable piston rod formed with a locking member at its leading end; and an engaging member provided at the other connecting section in conformity with the piston rod and detachably engageable with the locking member of the piston rod.

With the above connecting mechanism, the locking member of the piston rod provided at the one trailer unit is engaged with the engaging member provided in the other trailer unit while the connecting projection of one trailer unit is fitted into the connecting hole of the other trailer unit. Subsequently, the cylinder mechanism is driven to pull the piston rod back. In this way, the two trailer units can be securely integrally connected with the connecting projection fitted into the connecting hole.

Preferably, the connecting projection is formed by a conical member while the connecting hole is formed by a conical hole having a conical inner surface, and a central angle of the conical member is set larger than that of the conical hole.

With this arrangement, the outer surface of the conical member is pressed in line-contact with the inner surface of the conical hole over its entire circumference with the first and second trailer units connected by driving the cylinder mechanism. This securely prevents the displacement and shake of the conical member and the conical hole, with the result that the two trailer units can be securely integrally connected.

Alternatively, the connecting mechanism may comprise first and second tie rods provided at the connecting sections of the first and second trailer units such that end surfaces thereof are opposed to each other; a cap nut rotatably fitted on the leading end of one of the tie rods in such a manner as not to disengage from the one rod; and an externally threaded portion formed at the leading end of the other tie rod and engageable with the cap nut.

With this connecting mechanism, the cap nut provided on the one tie rod is spirally fastened to the externally threaded portion formed on the other tie rod with the end surface of the tie rod of the one trailer unit held in contact with that of the tie rod of the other trailer unit. By doing so, the two trailer units are securely integrally connected while the tie rods thereof are connected with each other via the cap nut.

Preferably, each of the first and second trailer units comprises a vehicle height changer for changing a vehicle height and a pair of lower frames arranged at the opposite ends with respect to the widthwise direction of the vehicle; and a cargo on a palette placed on the ground is held between the pair of lower frames as the vehicle is moved backward; and the vehicle height changer is driven to move the pair of lower frames upward, thereby loading the cargo together with the palette on the trailer.

With this construction, in loading the cargoes on the respective trailers, the cargoes are placed on the palettes on the ground and, then, the trailer units lowered by driving the vehicle height changers are moved backward to hold the palettes between the pair of frames. Subsequently, the vehicle height changers are driven in the reverse direction to raise the vehicle height to thereby load the cargoes on the trailer units. In unloading the loaded cargoes from the respective trailer units, the vehicle height changers are driven to lower the vehicle height until the palettes are brought into contact with the ground and then the trailer units are moved forward to unload the palettes.

In this way, since the cargoes are loaded onto and unloaded from the trailers by raising and lowering the vehicle height, it is not necessary to use a machine such as a crane as in the prior art, thereby realizing the rationalization of the loading and unloading operations.

The transporting vehicles are suitably used for transportation of concrete units for constructing the building. Specifically, concrete units for the building of the same specification are mass-produced at a factory, and a building is constructed by these concrete units transported to a building site. They are bulky heavy materials and increase a transportation cost. By using the inventive transporting vehicles for transportation of such concrete units, the concrete units which could be transported only one by one by usual and conventional transporting vehicles can be transported two at a time. Thus, it is effective in reducing the transportation cost.

More specifically, in transporting the concrete units, one concrete unit is loaded onto each of the connected first and second trailer units at the factory as a shipping end. The transporting vehicle runs on main roads to transport the two concrete units up to a place near the building site, where the second trailer unit is separated from the first trailer unit. Only the concrete unit loaded on the first trailer unit is transported to the building site and unloaded there. Then, the transporting vehicle is returned to the place where the second trailer unit is separated and the concrete unit on the second trailer unit is transferred to the first trailer unit and transported to the building site. By this shuttling transportation, the inventive transporting vehicles can cope with a situation where the road near the building site is narrow. In this aspect as well, the inventive transporting vehicles are effective.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A transporting vehicle, comprising;

a tractor;

a trailer to be hauled by the tractor, the trailer including a first trailer unit connectable with the tractor and a second trailer unit detachably connectable with the first trailer unit;

a pair of connecting mechanisms provided at mutually opposed connecting sections at opposite sides of the first and second trailer units for fixedly connecting the first and second trailer units with a rear end of the first trailer unit and a front end of the second trailer unit held opposed to each other, each of the pair of connecting mechanisms including:

a connecting hole formed in a connection surface of either one of the first and second trailer units;

a connecting projection provided on another one of the first and second trailer units in conformity with the connecting hole;

a cylinder mechanism provided at the connecting section of one of the first and second trailer units and having a projectable and retractable piston rod, a leading end of the piston rod having a locking member rotatably connected thereto, the locking member having a guidable rod; and an engaging member provided at the connecting section of the another one of the first and second trailer units in conformity with the piston rod and detachably engageable with the locking member of the piston rod; and a guide member provided at the connecting section of the another one of the first and second trailer units and formed with a guide groove engageable with the guidable rod so as to guide the locking member to an engaging position engaged with the engaging member and from a disengaging position from the engaging member.

2. A transporting vehicle according to claim 1, wherein the connecting projection has a conical outer surface, and the connecting hole has a conical inner surface, a central angle of the conical outer surface being set larger than that of the conical inner surface.

3. A transporting vehicle according to claim 1, wherein each of the first and second trailer units includes a vehicle height changer for changing a vehicle height and a pair of lower frames arranged at the opposite ends with respect to the widthwise direction of the vehicle, and wherein a cargo on a palette placed on the ground is held between the pair of lower frames as the vehicle is moved backward, and the vehicle height changer is driven to move the pair of lower frames upward, thereby loading the cargo together with the palette on the trailer.

4. A transporting vehicle according to claim 1, wherein each of the first and second trailer units includes a vehicle height changer for changing a vehicle height and a pair of lower frames arranged at the opposite ends with respect to the widthwise direction of the vehicle, and wherein a cargo on a palette placed on the ground is held between the pair of lower frames as the vehicle is moved backward, and the vehicle height changer is driven to move the pair of lower frames upward, thereby loading the cargo together with the palette on the trailer.

5. A transporting vehicle, comprising:

a tractor;

a trailer to be hauled by the tractor, the trailer including a first trailer unit connectable with the tractor and a second trailer unit detachably connectable with the first trailer unit; and a connecting mechanism provided at mutually opposed connecting sections of the first and second trailer units for fixedly connecting the first and second trailer units with a rear end of the first trailer unit and a front end of the second trailer unit held opposed to each other, wherein the connecting mechanism includes:

first and second tie rods provided at the connecting sections of the first and second trailer units such that end surfaces thereof are opposed to each other;

a cap nut rotatably fitted on the leading end of one of the ties rods in such a manner as not to disengage from the one rod; and an externally threaded portion formed at the leading end of the other tie rod and engageable with the cap nut.

6. A transporting vehicle according to claim 5, wherein each of the first and second trailer units includes a vehicle height changer for changing a vehicle height and a pair of lower frames arranged at the opposite ends with respect to the widthwise direction of the vehicle, and wherein a cargo on a palette placed on the ground is held between the pair of lower frames as the vehicle is moved backward, and the vehicle height changer is driven to move the pair of lower frames upward, thereby loading the cargo together with the palette on the trailer.

7. A transporting vehicle, comprising;

a tractor;

a trailer to be hauled by the tractor, the trailer including a first trailer unit connectable with the tractor and a second trailer unit detachably connectable with the first trailer unit;

a pair of connecting mechanisms provided at mutually opposed connecting sections at opposite sides of the first and second trailer units for fixedly connecting the first and second trailer units with a rear end of the first trailer unit and a front end of the second trailer unit held opposed to each other, each of the pair of connecting mechanisms including:

a cylinder mechanism provided at the connecting section of one of the first and second trailer units and having a projectable and retractable piston rod, a leading end of the piston rod having a locking member rotatably connected thereto, the locking member having a guidable rod; and an engaging member provided at the connecting section of the another one of the first and second trailer units in conformity with the piston rod and detachably engageable with the locking member of the piston rod; and a guide member provided at the connecting section of the another one of the first and second trailer units and formed with a guide groove engageable with the guidable rod so as to guide the locking member to an engaging position engaged with the engaging member and from a disengaging position from the engaging member.

8. A transporting vehicle according to claim 7, wherein each of the first and second trailer units includes a vehicle height changer for changing a vehicle height and a pair of lower frames arranged at the opposite ends with respect to the widthwise direction of the vehicle, and wherein a cargo on a palette placed on the ground is held between the pair of lower frames as the vehicle is moved backward, and the vehicle height changer is driven to move the pair of lower frames upward, thereby loading the cargo together with the palette on the trailer.

* * * * *